United States Patent
Kimoto et al.

(10) Patent No.: US 6,818,343 B1
(45) Date of Patent: Nov. 16, 2004

(54) BATTERY PACK WITH REDUCED TEMPERATURE DIFFERENTIAL BETWEEN CELLS

(75) Inventors: Shinya Kimoto, Toyohashi (JP); Mitsugu Takaki, Toyohashi (JP); Kenji Kimura, Osaka (JP); Toshinobu Yokoyama, Hirakata (JP); Shinsuke Fukuda, Toyohashi (JP); Yasuhiro Takahashi, Toyota (JP); Toshihiro Katsuta, Toyota (JP); Kieko Asakawa, Toyota (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 09/856,608

(22) PCT Filed: Nov. 29, 1999

(86) PCT No.: PCT/JP99/06671

§ 371 (c)(1),
(2), (4) Date: Jun. 27, 2001

(87) PCT Pub. No.: WO00/33398

PCT Pub. Date: Jun. 8, 2000

(30) Foreign Application Priority Data

Nov. 27, 1998 (JP) ............................................. 10-337820

(51) Int. Cl.[7] ........................ H01M 2/10; H01M 10/50; H01M 2/00
(52) U.S. Cl. ........................ 429/99; 429/120; 429/148; 429/149; 429/152
(58) Field of Search ........................ 429/99, 120, 148, 429/157, 149, 160, 152

(56) References Cited

U.S. PATENT DOCUMENTS

| | | | | | |
|---|---|---|---|---|---|
| 4,468,440 | A | * | 8/1984 | Evjen | ............................. 429/8 |
| 4,957,829 | A | * | 9/1990 | Holl | ............................. 429/99 |
| 5,756,227 | A | * | 5/1998 | Suzuki et al. | .................. 429/62 |
| 5,766,801 | A |   | 6/1998 | Inoue et al. | |

FOREIGN PATENT DOCUMENTS

| | | | | |
|---|---|---|---|---|
| EP | 834952 A2 | * | 4/1998 | ............ H01M/10/50 |
| EP | 952620 A1 | * | 10/1999 | ............. H01M/2/10 |
| JP | 50-23619 |   | 6/1975 | |
| JP | 3-109269 |   | 11/1991 | |
| JP | 3-291867 |   | 12/1991 | |
| JP | 7-14616 |   | 1/1995 | |
| JP | 9-219181 |   | 8/1997 | |
| JP | 9-306447 |   | 11/1997 | |
| JP | 10-106521 |   | 4/1998 | |
| JP | 10-154494 |   | 6/1998 | |
| JP | 10-189062 |   | 7/1998 | |

* cited by examiner

Primary Examiner—Gregg Cantelmo
(74) Attorney, Agent, or Firm—Jordan and Hamburg LLP

(57) ABSTRACT

A plurality of cells (1a to 1j) are abutted against each other and electrically connected on the short sides of rectangular battery housings (2), and binding plates (14, 14) disposed on both long sides are tied together with binding bands (13) to integrally link the cells (1a to 1j). Because the heat radiation conditions are equalized among the cells (1a to 1j), there is an extremely small temperature differential between the cells, charging efficiency, which varies with temperature conditions, is consistent, and there is no variance in battery capacity, so none of the cells are over-discharged, and battery life is extended.

7 Claims, 15 Drawing Sheets

BATTERY PACK WITH REDUCED TEMPERATURE DIFFERENTIAL BETWEEN CELLS

TECHNICAL FIELD

The present invention relates to a rechargeable battery configured in the form of a battery pack in which a plurality of cells are connected so as to obtain the required electrical capacity, and more particularly to a rechargeable battery in which the heat radiation of the battery pack is enhanced and there is less temperature differential between cells, so that charging efficiency is equalized and there is no variance in the battery capacity of the various cells.

BACKGROUND ART

A conventional rechargeable battery constructed such that the required electrical capacity is obtained by connecting and integrally linking a plurality of cells into a battery pack is structured as shown in FIG. 16, for example. This rechargeable battery is an example of a battery pack made up of sealed alkaline rechargeable batteries, and the cells 1a to 1j that make up this battery pack are constructed as shown in FIG. 15.

In FIG. 15, the cell 1 is constructed such that a group of electrode plates 7, comprising positive and negative electrode plates layered with separators between them, is housed in a battery housing 2 along with electrolyte, the opening in the battery housing 2 is closed off with a cover 6 provided with a safety vent 5, and a positive electrode terminal 3, which is connected to leads taken from the positive electrode plates of the group of electrode plates 7, and a negative electrode terminal 4, which is connected to leads 9 taken from the negative electrode plates, are attached to the cover 6.

When the battery pack is put together, as shown in FIG. 16, the plurality of cells 1a to 1j are abutted against each other between the long (wide) sides of the battery housings 2, and the end plates 32, which are abutted against the outsides of the battery housings located at the ends, are bound together with binding bands 33 to integrally link the cells 1a to 1j. The positive electrode terminals 3 and negative electrode terminals 4 between linked adjacent cells 1 are connected by connector plates 31, and the cells 1 are connected in series. When the battery housings are linked, ribs 8 formed vertically on the long sides of the battery housings 2 are aligned with the ribs 8 on the adjacent battery housings 2, forming coolant passages that open above and below the battery housings 2 between the paired ribs 8.

A rechargeable battery generates joule heat and reaction heat through the chemical reaction that accompanies charging and discharging. The greater is the electrical capacity, the more heat is generated, and if the battery is sealed, the radiation of heat to outside the battery is slowed and even more heat builds up inside the battery, so when a battery pack with a large electrical capacity is made up of sealed rechargeable batteries, it is essential to provide some means for the efficient radiation of the heat that is generated. With the conventional rechargeable battery structure shown in FIG. 16, the coolant passages are formed by the ribs 8 between adjacent cells 1 as mentioned above, so heat generated by the cells 1 can be effectively radiated by forcing a coolant such as air through these coolant passages. A heat radiation structure such as this is disclosed in Japanese Laid-Open Patent Application No. 3-291867.

Nevertheless, when a battery pack is produced by arranging cells as in this conventional structure, a problem is that the greater is the number of cells 1 arranged, the greater is the temperature differential between the cells 1 located toward the middle and the cells 1 located on the outer ends. With the conventional structure shown in FIG. 16, the cells 1a and 1j located on the outer ends are less subjected to the effects of the heat generated by the other cells 1, and the end plates 32 also carry away some of the heat, so these cells are under good thermal radiation conditions. The closer a cell 1 is to the middle, the more it is affected by the heat generated by the cells 1 to either side, so the temperature rises more and heat radiation is not as good. Consequently, with a conventional structure, the closer a cell 1 is to the middle, the worse its heat radiation conditions are, the result being a temperature differential in which the temperature of the cells 1a to 1j is lower toward outside and higher toward the middle.

The charging efficiency of a rechargeable battery is affected by the temperature thereof, so if there is a temperature differential between the cells that make up the battery pack, as with a conventional structure, there will be a difference in the electrical capacity of the various cells. With a battery pack in which cells whose capacity thus varies are connected in series, those cells with lower capacity are in a state of overdischarge at the end of discharge. Repeated charging and discharging in this state in which there is a difference in the capacity of the cells shortens the cycling life of a battery pack and leads to diminished dischargeable capacity.

It is an object of the present invention to provide a rechargeable battery with enhanced performance as a battery pack, with no temperature differential between the cells that make up the battery pack.

DISCLOSURE OF THE INVENTION

The rechargeable battery according to a first aspect of the present invention for achieving the above object is characterized in that a battery housing containing elements for electromotive force of a cell is formed in a rectangular shape having short sides with a narrow width and long sides with a wide width, and a plurality of cells are linked together adjacent to one another between the short sides of this battery housing to form a battery pack with a required electrical capacity.

With the structure of this rechargeable battery, the plurality of cells that make up the battery pack are arranged in a single row with the short sides of the battery housings next to each other, so the long sides of the cells all face outward and the temperature environment thereof is equalized, resulting in an extremely small temperature differential between the cells. Therefore, there is also less difference in charging efficiency, which varies with the battery temperature, and there is no variance in the cell capacity, so none of the cells is overdischarged during discharging, and the cycling life of the rechargeable battery can be kept long.

The rechargeable battery according to a second aspect of the present invention for achieving the above object is characterized in that a battery housing containing elements for electromotive force of a cell is formed in a rectangular shape having short sides with a narrow width and long sides with a wide width, a plurality of cells are linked together adjacent to one another between the short sides of their battery housings to form battery modules, these battery modules are arranged in parallel in a plurality of rows adjacent to one another between the long sides of the battery housings, and the plurality of rows of battery modules are linked together to form a battery pack with a required electrical capacity.

With the structure of this rechargeable battery, the plurality of cells that make up the battery pack are arranged in a single row with the short sides of the battery housings next to each other, thus forming a battery module, and these battery modules are arranged in parallel in a plurality of rows, so the long sides of the cells face outward and the temperature environment is equalized, resulting in an extremely small temperature differential between the cells. Therefore, there is also less difference in charging efficiency, which varies with the battery temperature, and there is no variance in the cell capacity, so none of the cells is overdischarged during discharging, and the cycling life of the rechargeable battery can be kept long. It is also possible to increase the number of battery modules linked or shorten the linkage length by further disposing in parallel battery modules linked on the short sides.

In the above structure, if a heat transfer plate with good thermal conductivity is provided between the battery modules disposed in parallel, then the heat between the sides facing each other in parallel, where the long sides of the battery housings are next to each other and heat radiation is not as good, can be exchanged to the heat transfer plate, and the temperature can be kept from rising between sides facing each other in parallel where heat radiation is not as good.

Also, if a heat transfer plate with good thermal conductivity is provided between the battery modules disposed in parallel, and if end heat transfer plates exposed to the outside of the plurality of integrated cells are linked to the ends of this heat transfer plate in the direction in which the battery modules are linked, then the heat of the heat transfer plate, the temperature of which is increased through heat exchange, can be radiated from the end heat transfer plates exposed to the outside.

Active cooling via a heat exchanger is also possible by making a coolant flow through the heat transfer plate and/or the end heat transfer plates, which allows the various battery modules to be maintained at the optimal temperature.

If a plurality of cells are linked together with the elements for electromotive force of each cell provided inside a battery case in which the individual battery housings are integrally formed adjacent to one another between the short sides thereof, then the plurality of cells will be integrally structured such that the battery case common to the plurality of cells serves as the battery housings of the various cells, so the structure linking the battery housings can be formed more easily.

Also, if the plurality of cells are sandwiched between a pair of binding plates, and the pair of binding plates together are tied together, the plurality of cells can be integrally linked, and can be securely linked integrally regardless of the arrangement of the plurality of cells.

The plurality of cells can be integrally linked with the linking position and linking direction varied as desired, so that instead of being linked in a straight line, they can also be linked so as to curve in any direction, depending on the place where the rechargeable battery will be installed.

A plurality of ribs can also be formed on the sides of the battery housings, and a coolant made to flow through the spaces formed between the ribs. Coolant passages are formed between the ribs by contact between the ribs and the binding plates or between the ribs of adjacent battery housings or case, and the heat radiation of the various cells can be effectively achieved by making a coolant flow through these coolant passages.

BEST MODE FOR CARRYING OUT THE INVENTION

To facilitate an understanding of the present invention, embodiments of the present invention will now be described through reference to the accompanying drawings. The embodiments discussed below are merely specific examples of the present invention, and do not limit the technological scope of the present invention.

In these embodiments, a nickel metal-hybrid rechargeable battery, which is an example of an alkaline rechargeable battery, is configured as a battery pack, but this structure can be similarly applied to other types of rechargeable battery as well. The structure of rechargeable batteries pertaining to various embodiments of the present invention will now be described through reference to FIGS. 1 to 12. Those elements that are common to a conventional structure are labeled the same, and only the novel elements of the present structure are described.

Figure 1:
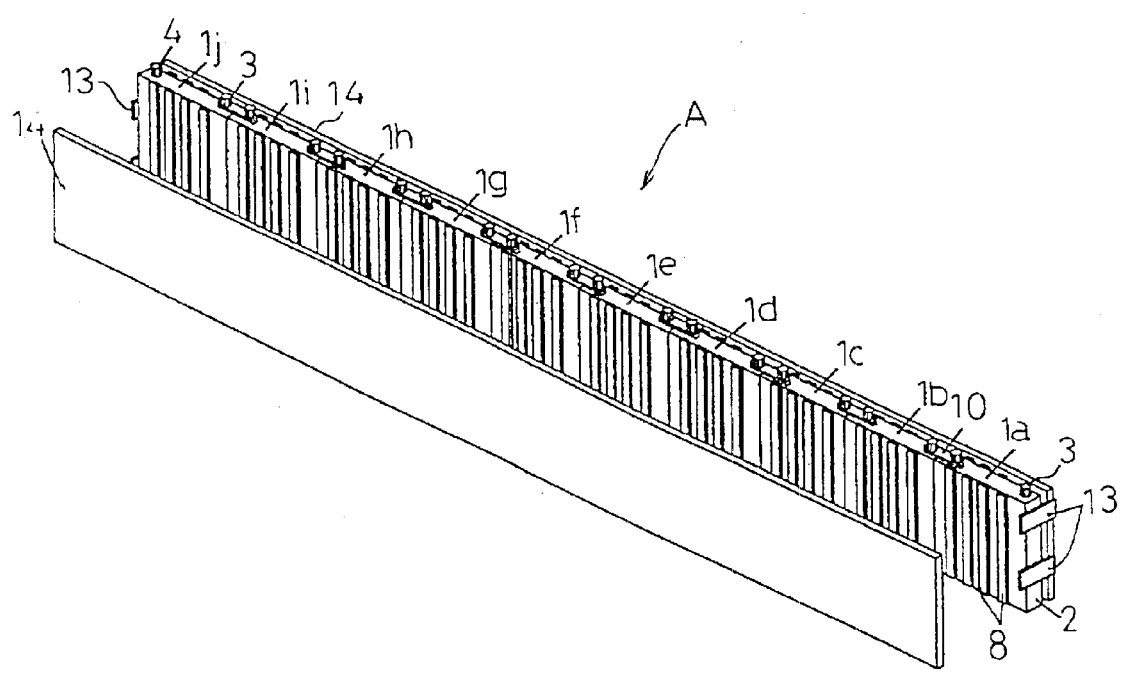
FIG. 1 is a perspective view of the structure of a rechargeable battery A pertaining to the first embodiment.

In FIG. 1, the rechargeable battery A pertaining to the first embodiment is structured such that ten cells 1*a* to 1*j* that are nickel metal-hybrid rechargeable cells are linked together, and the positive and negative electrode terminals 3 and 4 of the cells 1*a* to 1*j* are connected in series to form a battery pack that provides the required output voltage. The cells 1*a* to 1*j* are arranged in a chain, with the short (narrow) sides of the battery housings 2 (each of which is formed in a rectangular shape) abutted against one another. These are integrally linked together by being sandwiched between binding plates 14 on the long (wide) sides of the battery housings 2. The two binding plates 14 are fixed by being tightly fitted between binding bands 13 at the ends, as shown in the figure.

Figure 2:
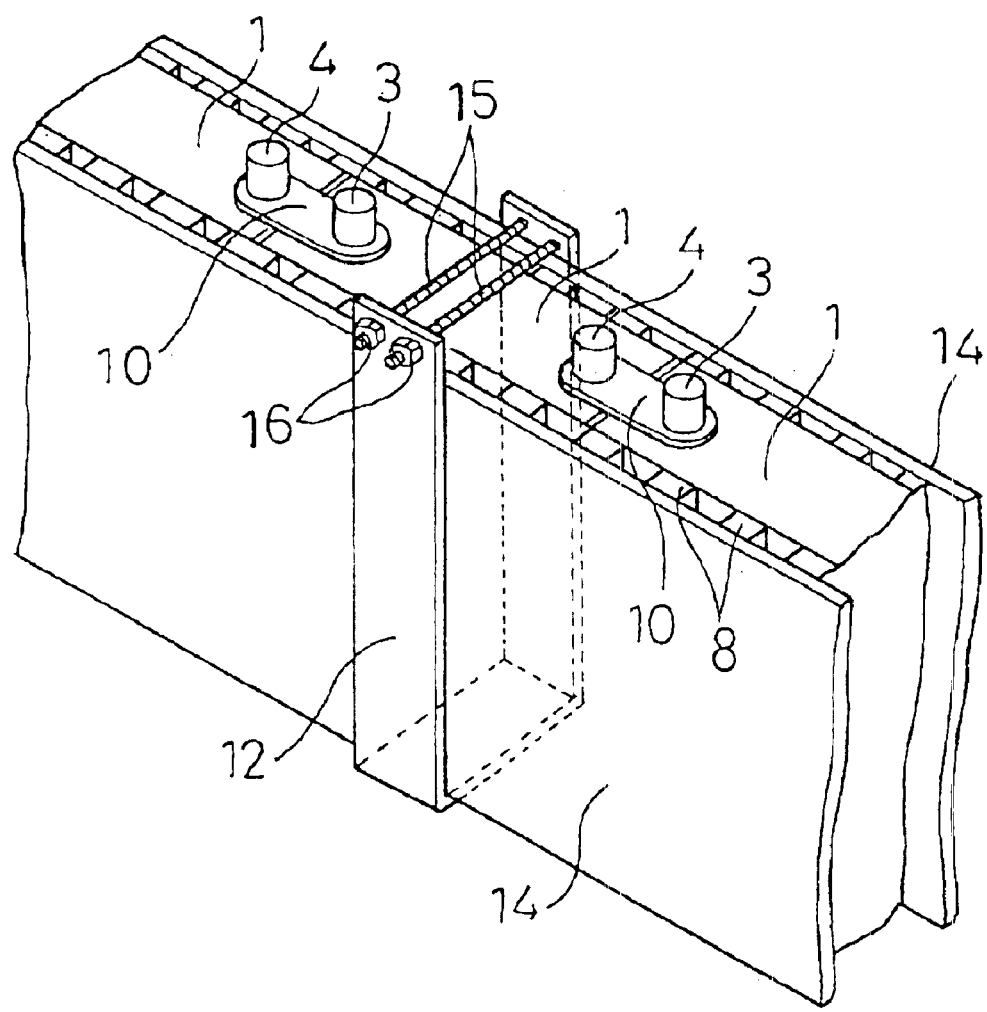
FIG. 2 is a perspective view of a structure in which the binding structure of the cells is reinforced by binding plates.

If a large number of cells 1 are to be linked up, tightly fitting the ends of the long binding plates 14 between the binding bands 13 can result in bulging in the middle portion if the binding plates 14 are made from a thin material, and this results in looseness in the linking of the cells 1. In a case such as this, the binding plates 14 may be held in place by binding members in the middle or at a plurality of locations along the binding plates 14. For example, as shown in FIG. 2, a U-shaped binding member 12 can be fitted around the binding plates 14 from underneath at a location in the middle, and the open ends of this binding member 12 tightened with bolts 15 and nuts 16, allowing a long chain of linked cells to be bound securely.

Figure 3:
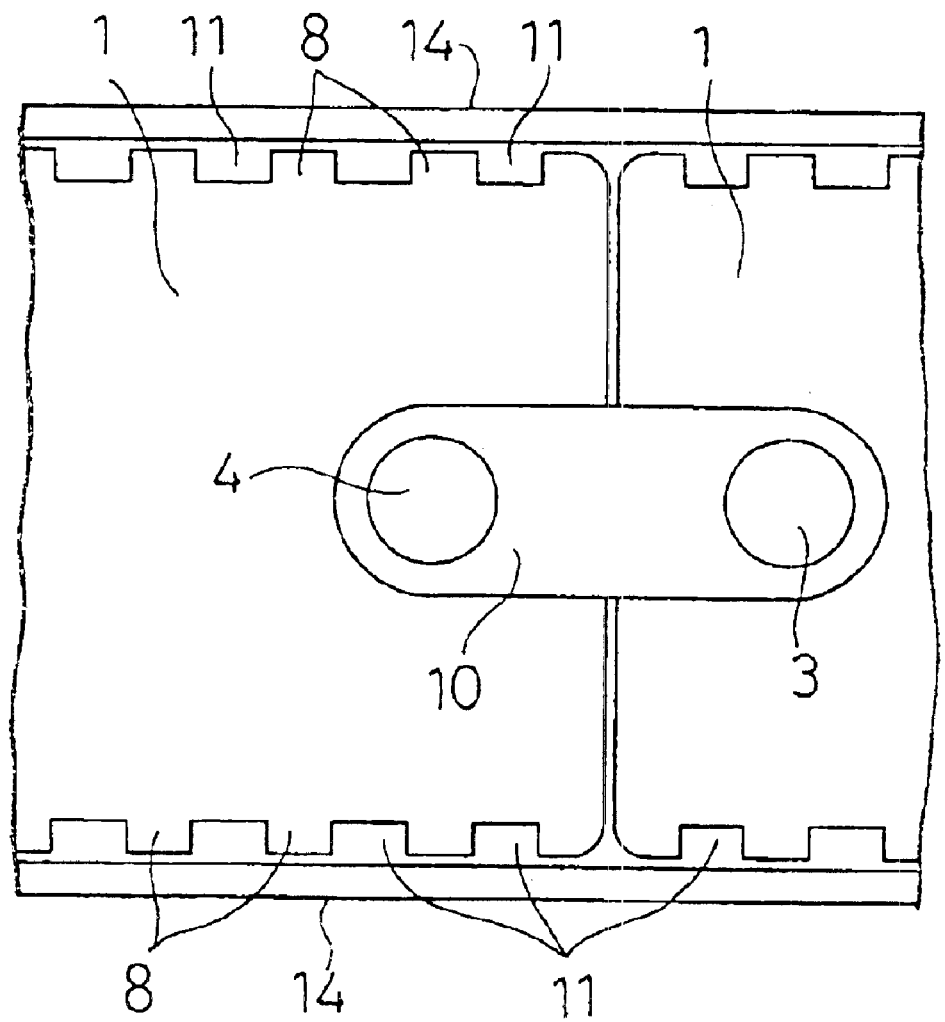
FIG. 3 is a plan view of the formation of cooling passages in the structure of the first embodiment.

The binding plates 14 bind the linked cells 1a to 1j and, at the same time, come into contact with the plurality of ribs 8 formed on the long sides of the battery housings 2 of the cells 1, thereby forming cooling passages 11 between the plurality of ribs 8, as shown in FIG. 3. A coolant such as air is forced to pass through these cooling passages formed vertically around the cells 1, and as a result, the heat generated by the cells 1a to 1j is taken away by the air from both of the long sides of the battery housings 2, and the cells 1a to 1j are cooled.

When a battery pack is cooled in this way, the cooling is the same for all the cells 1a to 1j regardless of their arrangement positions, so the temperature of the cells 1a to 1j is equalized.

Because the charging efficiency of a rechargeable battery is affected by the temperature thereof, when a plurality of cells are connected to produce a battery pack, a difference in the charging efficiency occurs if the temperatures of the various cells are different, and this results in a difference in the capacity of the various cells. As a result, those cells with lower capacity will be in a state of overdischarge at the end of discharge, which not only leads to deterioration in these cells, but also lowers the dischargeable capacity of the battery pack. Therefore, equalizing the temperatures of the cells is very important in putting together a battery pack, and with the structure of the first embodiment above, the temperature environment is nearly the same for all the cells 1a to 1j, and the charging efficiency of the cells 1a to 1j is equalized. Therefore, the performance of the cells 1a to 1j is maintained at an equal level. None of the cells 1 falls into an overdischarged state during discharging, and the cycling life and dischargeable capacity of the battery pack are kept stable.

Figure 4:
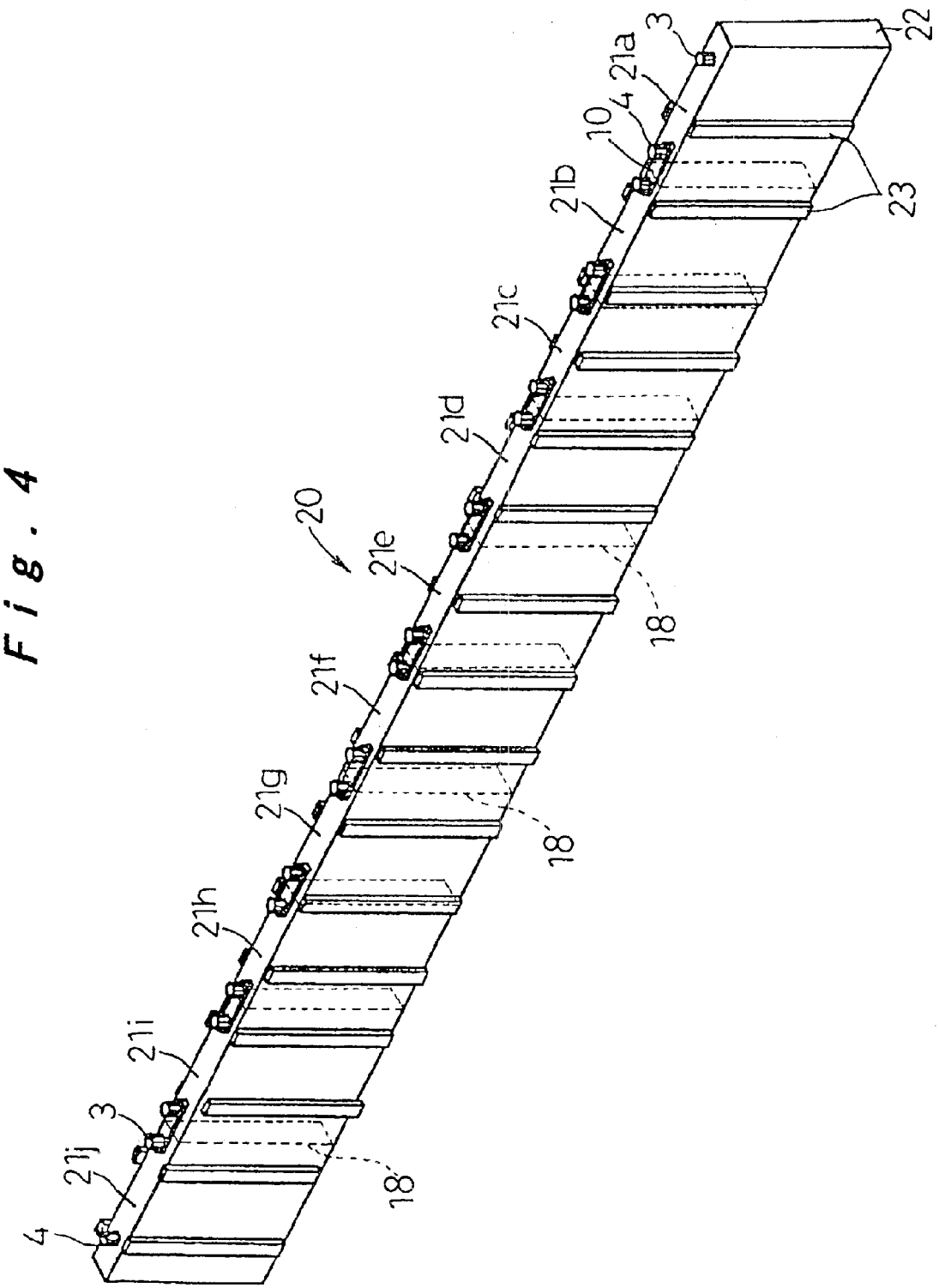
FIG. 4 is a perspective view of the battery pack structure pertaining to the second embodiment.

FIG. 4 illustrates the structure of a battery pack 20 that makes use of the rechargeable battery B of the second embodiment. The battery housings of the ten cells 21a to 21j are integrally formed as a battery case 22. From the outside it appears that this battery case 22 is a single piece, but partitions 18 are provided in units of the cells 21a to 21j, so that the cells 21a to 21j are independent of one another. Thus, the cells 21a to 21j are structurally integrated but are independent from one another, so the positive electrode terminals 3 and negative electrode terminals 4 thereof are connected in series by connector plates 10 to produce a battery pack that provides the required output voltage. If this battery pack 20 has a relatively small capacity, it can be used by allowing heat to dissipate naturally as long as the temperature environment is good. However, if the battery pack has a relatively large capacity and the mechanial strength thereof is to be maintained, the mechanical structure must be reinforced by attaching the binding plates 14, as shown in FIG. 5, and the rechargeable batteries B must also have a heat radiation structure.

Figure 5:
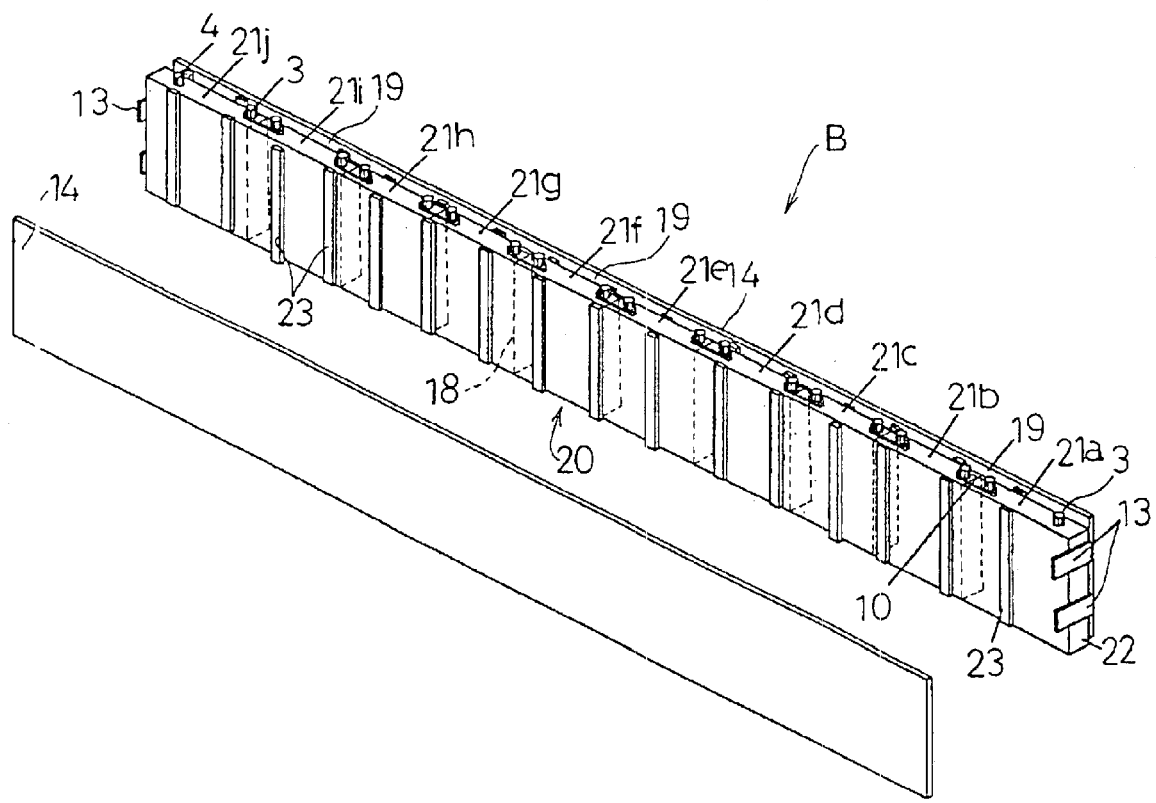
FIG. 5 is a perspective view of the structure of a rechargeable battery B pertaining to the second embodiment.

As shown in FIG. 5, rechargeable battery B is structured such that the binding plates 14 are abutted against ribs 23 formed on both sides of the battery pack 20, and these binding plates 14 are bound together at both ends thereof by binding bands 13. Since the battery housings of the cells 21a to 21j are integrated as the battery case 22, the heat generated by the cells 21a to 21j is dispersed evenly in the integrated battery case 22. Furthermore, because the heat radiation conditions are nearly the same for all the cells 21a to 21j, there is little temperature differential between the cells 21a to 21j. Just as with the structure in the first embodiment, a cooling structure in which heat radiation is enhanced by forcing air to flow through cooling passages 19 formed between the battery case 22 and the binding plates 14 by the ribs 23 yields substantially the same heat radiation effect in the cells 21a to 21j, so there is little temperature differential between the cells 21a to 21j, and the performance of the cells 21a to 21j is maintained at an equal level. Therefore, the charging efficiency of the cells 21a to 21j is equalized, none of the cells 1 falls into an overdischarged state during discharging, and the cycling life and dischargeable capacity of the battery pack are kept stable.

The rechargeable batteries A and B described above are longer in the direction in which the cells are arranged, but they are thin, so they could be installed in the housings of electrical equipment, devices, etc., since most of these housings are formed in a linear shape, and this would allow the housing volume to be effectively utilized. Also, since a narrow space can be effectively utilized, these rechargeable batteries are advantageous for installation in electric cars, where space for holding the rechargeable batteries is at a premium. The cells do not necessarily have to be linked in a straight line, and may instead bend at a right angle at some point in the linkage, or may be arranged in a U-shape, so the linking configuration can be tailored to the available holding space.

Figure 6:
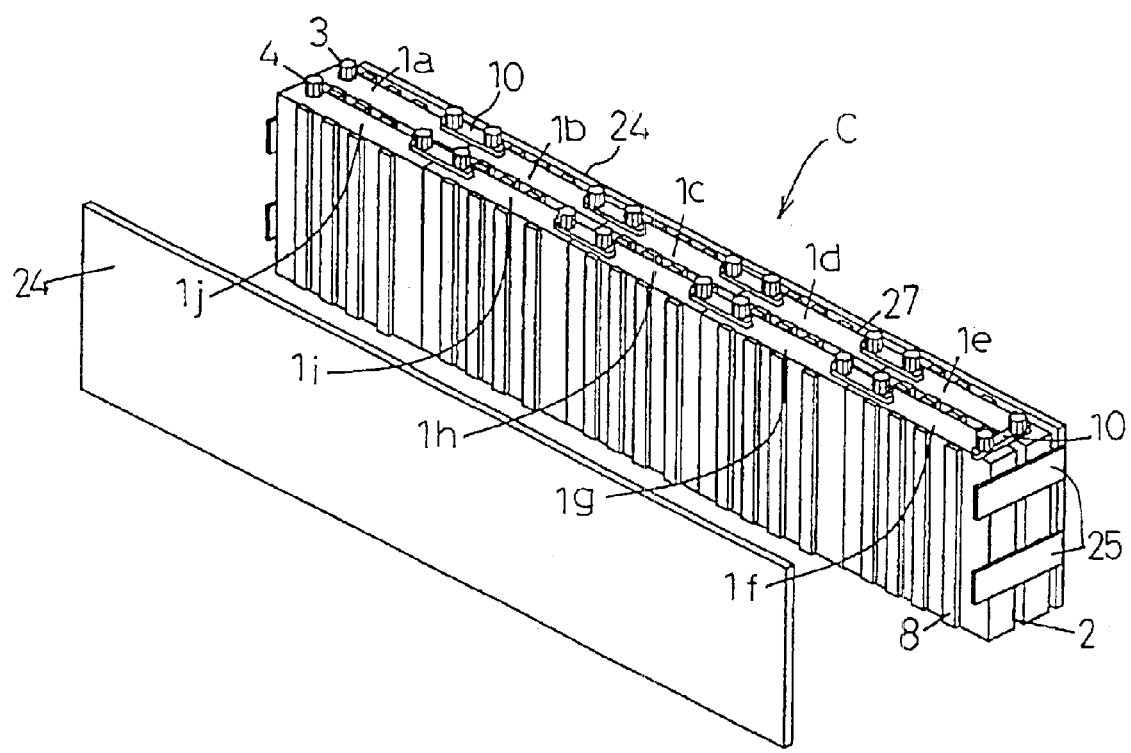
FIG. 6 is a perspective view of the structure of a rechargeable battery C pertaining to the third embodiment.

FIG. 6 illustrates the structure of a rechargeable battery C pertaining to the third embodiment, in which the cells are laid out in a doubled-back configuration so as to minimize the length of the rechargeable battery in the cell arrangement direction. Rechargeable battery C has ten cells 1a to 1j laid out in two rows of five batteries each, and the same output voltage can be obtained as with rechargeable battery A in the first embodiment. With this structure, the length in the direction of cell arrangement is shorter than that of rechargeable battery A, which is useful when the holding space is restricted in the lengthwise direction. If there are no space restrictions, and a high output voltage is required, then rechargeable battery A can also be laid out in two rows to produce this doubled-back configuration.

In FIG. 6, rechargeable battery C is structured such that the cells 1a to 1j, which are electrically connected in series, are laid out in two rows consisting of a row of cells 1a to 1e (battery module) and a row of cells 1f to 1j (battery module). The two rows are abutted against each other at the ribs 8 formed on the long sides of the battery housings 2. Binding plates 24 are abutted against the ribs 8 formed on the long sides, and serve as the outsides of each row. These binding plates 24 are bound together at their ends by binding bands 25. The part of this structure that is different from rechargeable battery A in the first embodiment is that the heat radiation conditions are not as good on the side where the cells 1 are against each other on the long sides.

Figure 7A:
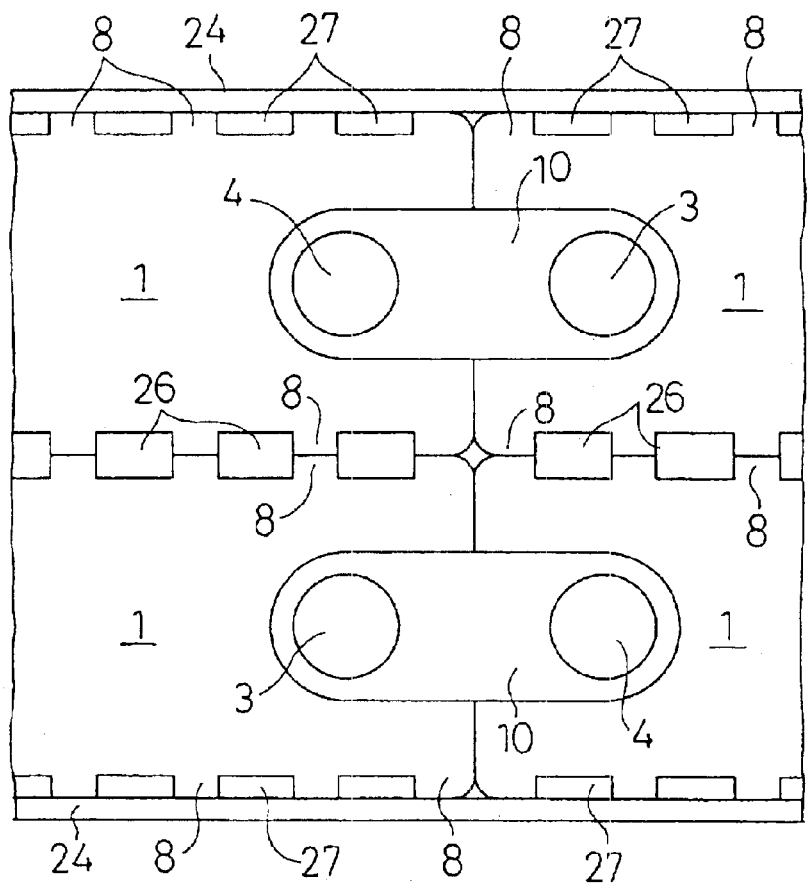
FIG. 7 is a plan view of the formation of cooling passages in the structure of the third embodiment.
Figure 7B:
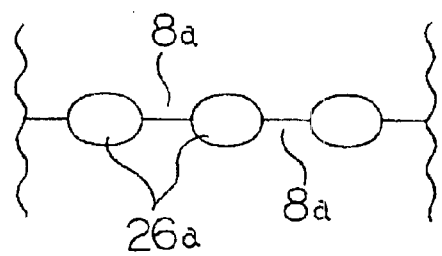
Figure 7C:
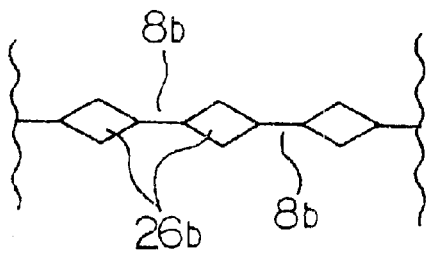

As shown in FIG. 7A, the facing ribs 8 butt up against each other on the side where the parallel rows of cells 1 are in contact, and central cooling passages 26 are formed in between these ribs. Meanwhile, outer cooling passages 27 are formed where binding plates 24 are butted against the ribs 8 on the long sides on the outside. The cells 1a to 1j are cooled by the passage of air which is forcibly sent through these central cooling passages 26 and outer cooling passages 27, but the heat radiation conditions are not as good on the long sides on the inside because the temperature is raised by the effect of the heat generated between the cells on this side. In contrast, the heat radiation conditions are good on the long sides on the outside because heat is transferred to the binding plates 24 and because of the greater contact with outside air. Thus, with the structure of rechargeable battery C, there is a temperature differential between the long sides on the inside of the individual cells 1 and the long sides on the outside, but these conditions are the same for all the cells $1a$ to $1j$, and the temperatures of the various cells $1a$ to $1j$ are equalized. Therefore, equalization of charging efficiency can be achieved, and the cycling life and dischargeable capacity of the battery pack can be kept stable. The ribs 8 can have any cross sectional shape desired, so the central cooling passages 26 can also have an opening shape as shown in FIGS. 7B and 7C. The same applies to the outer cooling passages 27.

Figure 8:
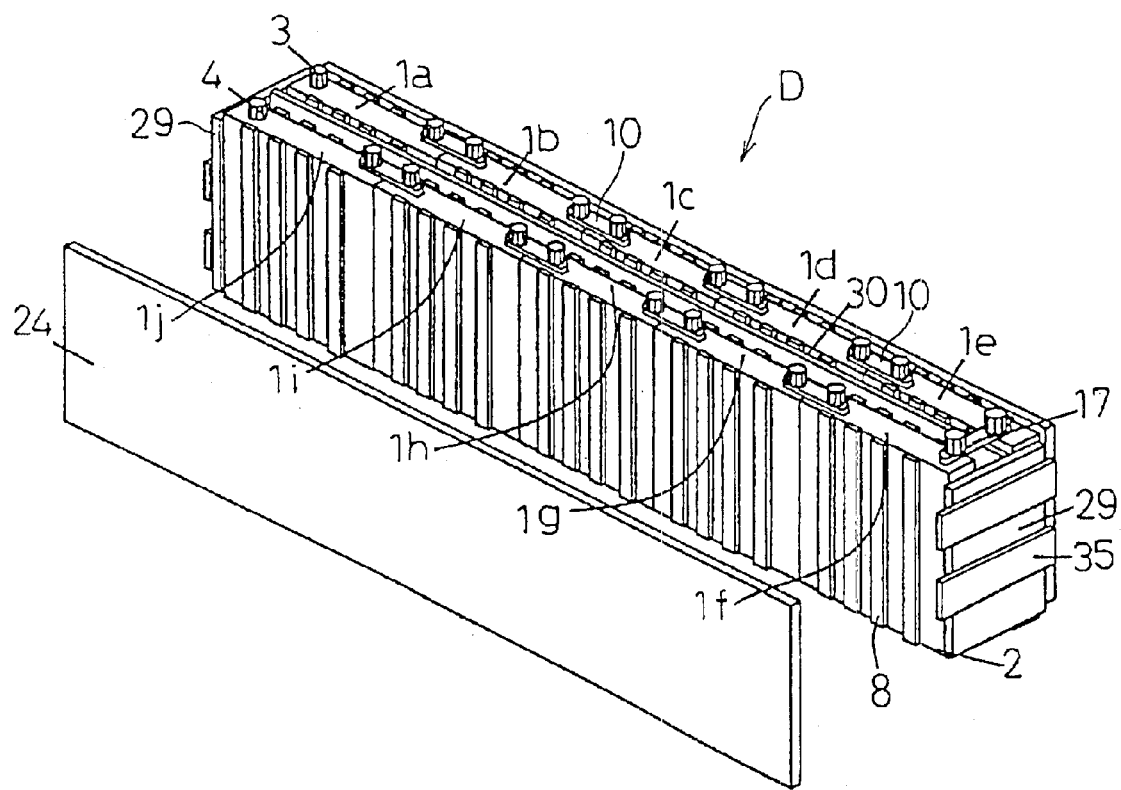
FIG. 8 is a perspective view of the structure of a rechargeable battery D pertaining to the fourth embodiment.
Figure 9:
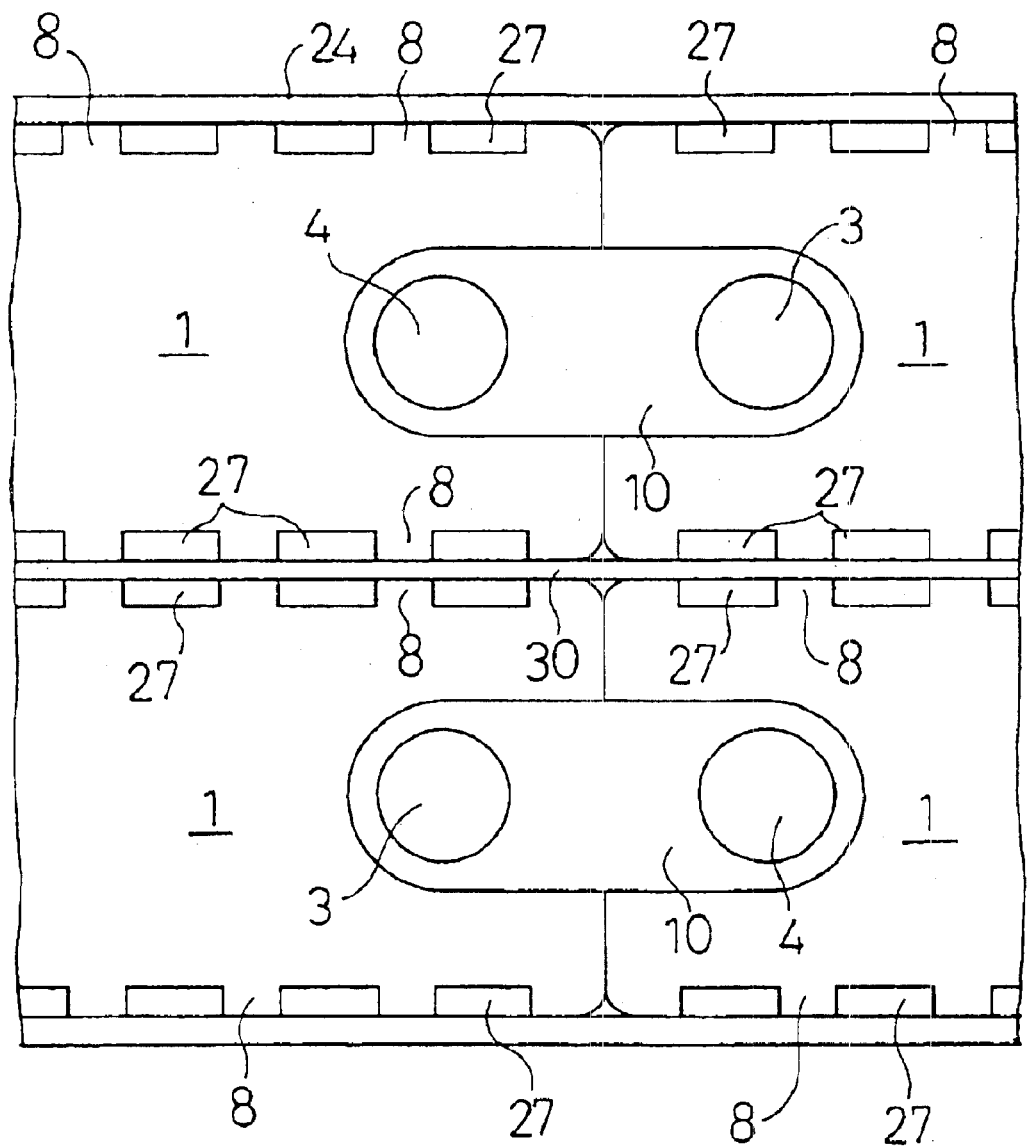
FIG. 9 is a plan view of the formation of cooling passages in the structure of the fourth embodiment.

FIG. 8 illustrates the structure of a rechargeable battery D pertaining to the fourth embodiment. Rechargeable battery D is structured such that a heat transfer plate 30 is provided between the row of cells $1a$ to $1e$ and the row of cells $1f$ to $1j$ in the structure of rechargeable battery C pertaining to the third embodiment, and end heat transfer plates 29 are provided at the ends of this heat transfer plate 30. This heat transfer plate 30 is made from a material with good thermal conductivity, such as aluminum or copper, and therefore takes heat away from the cells 1 through contact with the cells $1a$ to $1j$ and the outer cooling passages 27 as shown in FIG. 9. Provision of the heat transfer plate 30 also enhances the effect of heat exchange between the cells 1 and the coolant, and improves heat radiation between parallel cells 1, so there is less temperature differential between the inside and outside of the cells 1. Also, because the heat transfer plate 30 is linked at its ends to the end heat transfer plates 29, exchanged heat can escape to the end heat transfer plates 29. The end heat transfer plates 29 have sides that are open to the outside, and are in contact with binding bands 35, so heat radiation is good and the heat of the heat transfer plate 30 can be effectively radiated.

When a structure featuring this heat transfer plate 30 and end heat transfer plates 29 is employed, the temperatures of the cells $1a$ to $1j$ are substantially equal, and equalization of charging efficiency can be achieved even in a structure in which chains of cells 1 linked at the short sides thereof are linked in parallel. Therefore, none of the cells 1 falls into an overdischarged state, and the cycling life and dischargeable capacity of the battery pack are kept stable.

If the heat transfer effect is improved by the above-mentioned heat transfer plate 30 and end heat transfer plates 29, then it is also possible to have three or more parallel rows, and not just the two parallel rows shown in FIG. 8. For instance, using a material with even better thermal conductivity for the heat transfer plate 30, or giving the heat transfer plate 30 a hollow construction in which cooling passages are formed, allows temperature increases to be minimized at the opposing sides between the parallel rows of cells 1, and keeps the temperature the same as that of the cells 1 located on the outside.

Figure 10A:
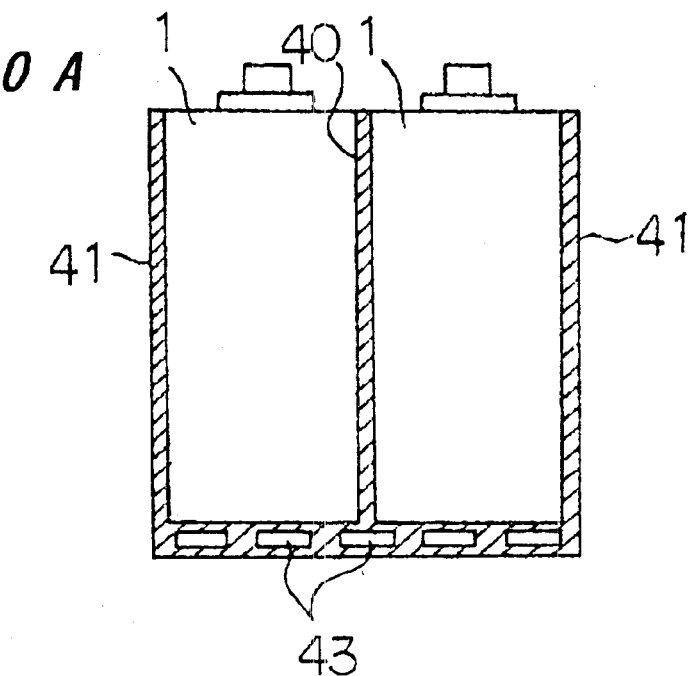
FIG. 10 is a cross section of a variation example in which the heat radiation of the heat transfer plates is enhanced.
Figure 10B:
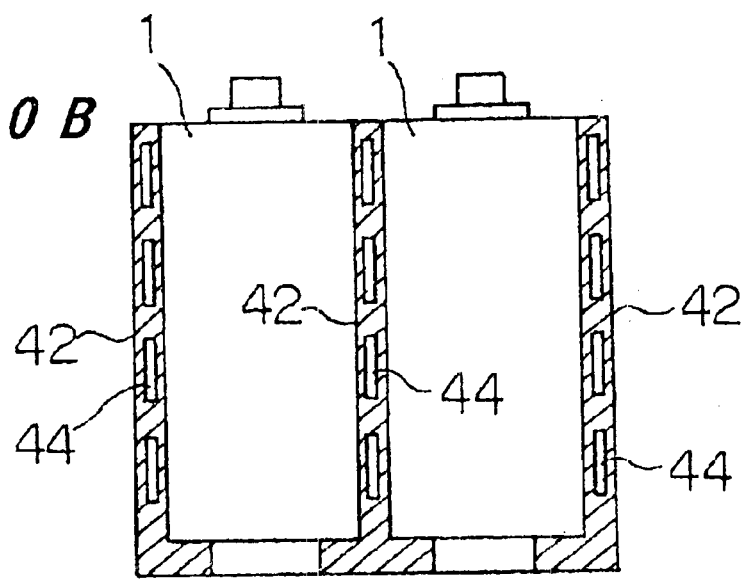

As shown in FIG. 10A, the heat radiation effect can be further enhanced by forming a heat transfer plate 40, disposed between adjacent cells 1, integrally with heat transfer plates 41 corresponding to the binding bands, and providing cooling passages 43 at the bottom surface connecting the heat transfer plate 40 and the heat transfer plates 41. Also, as shown in FIG. 10B, the heat radiation effect can be further enhanced by providing cooling passages 44 to each of several heat transfer plates 42. The heat radiation effect can also be enhanced by making a coolant flow through a heat exchanger at an exposed location of the end heat transfer plates 29. The heat radiation effect can be further enhanced by providing cooling passages to the end heat transfer plates 29.

The structure illustrated in the third and fourth embodiments above can be similarly applied to the structure of rechargeable battery B featuring the battery case 22 as illustrated in the second embodiment.

Figure 11:
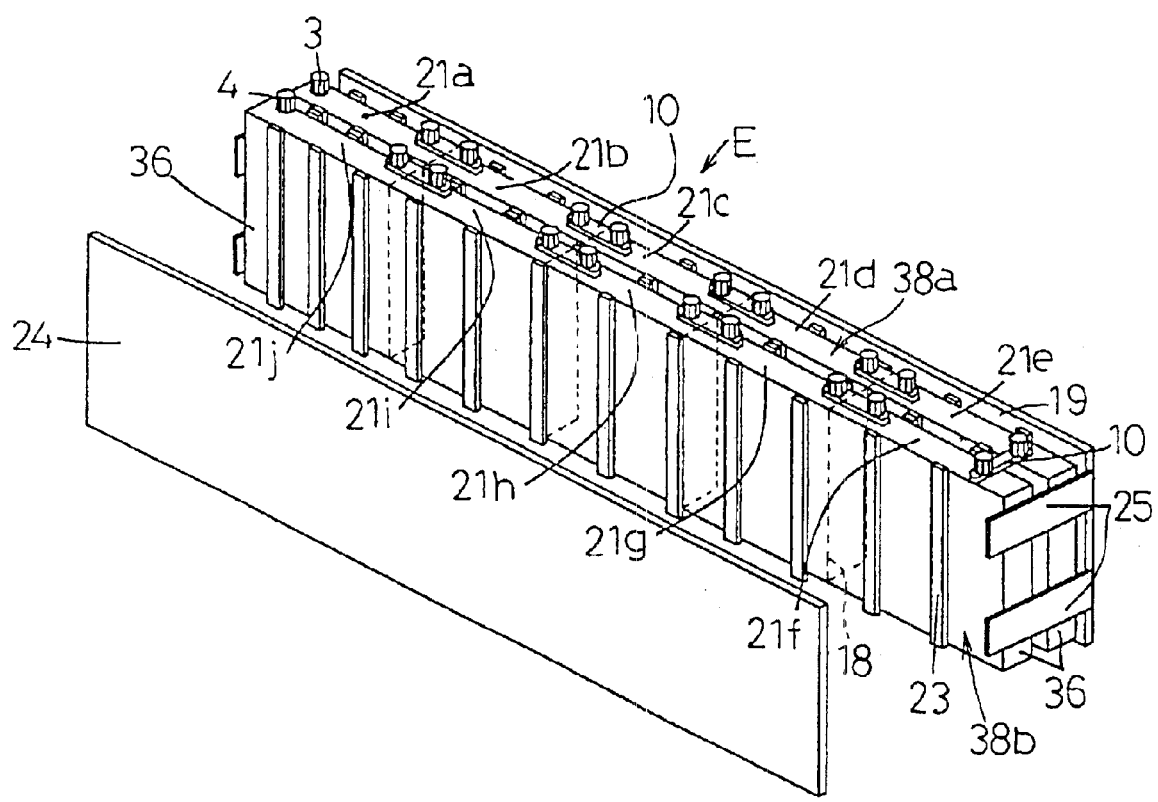
FIG. 11 is a perspective view of the structure of a rechargeable battery E pertaining to the fifth embodiment.

FIG. 11 illustrates the structure of a rechargeable battery E pertaining to the fifth embodiment. Rechargeable battery E is structured such that a battery module $38a$, comprising five cells $21a$ to $21e$ integrally connected by battery cases 36 provided with partitions 18, and a battery module $38b$, comprising five similarly integrally connected cells $21f$ to $21j$ are butted together in parallel rows, binding plates 24 are butted against the outsides of the grouped batteries $38a$ and $38b$, and the ends of these binding plates 24 are bound and fixed by binding bands 25.

Figure 12:
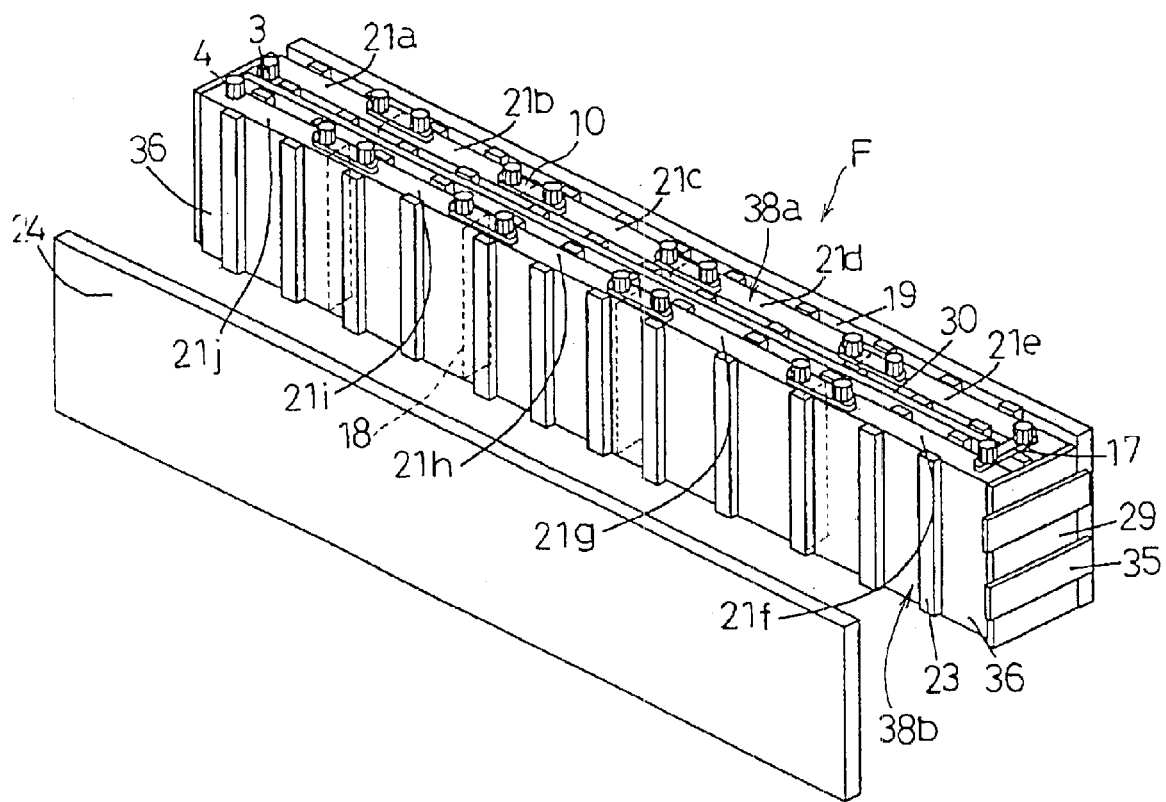
FIG. 12 is a perspective view of the structure of a rechargeable battery F pertaining to the sixth embodiment.

FIG. 12 illustrates the structure of a rechargeable battery F pertaining to the sixth embodiment. Rechargeable battery F is structured such that a battery module $38a$, comprising five cells $21a$ to $21e$ integrally connected by battery cases 36 provided with partitions 18, and a battery module $38b$, comprising five similarly integrally connected cells $21f$ to $21j$ are butted together in parallel rows with the heat transfer plate 30 sandwiched in between, the ends of this heat transfer plate 30 are linked by the end heat transfer plates 29, the binding plates 24 are butted against the outsides of the grouped batteries $38a$ and $38b$, and the ends of these binding plates 24 are bound and fixed by binding bands 35.

The heat radiation action and effect of these rechargeable batteries E and F are the same as with the structures described above for the third and fourth embodiments, and therefore will not be described again, but the difference from prior art will be illustrated through the following test results for heat radiation effect and cycling life.

Figure 16:
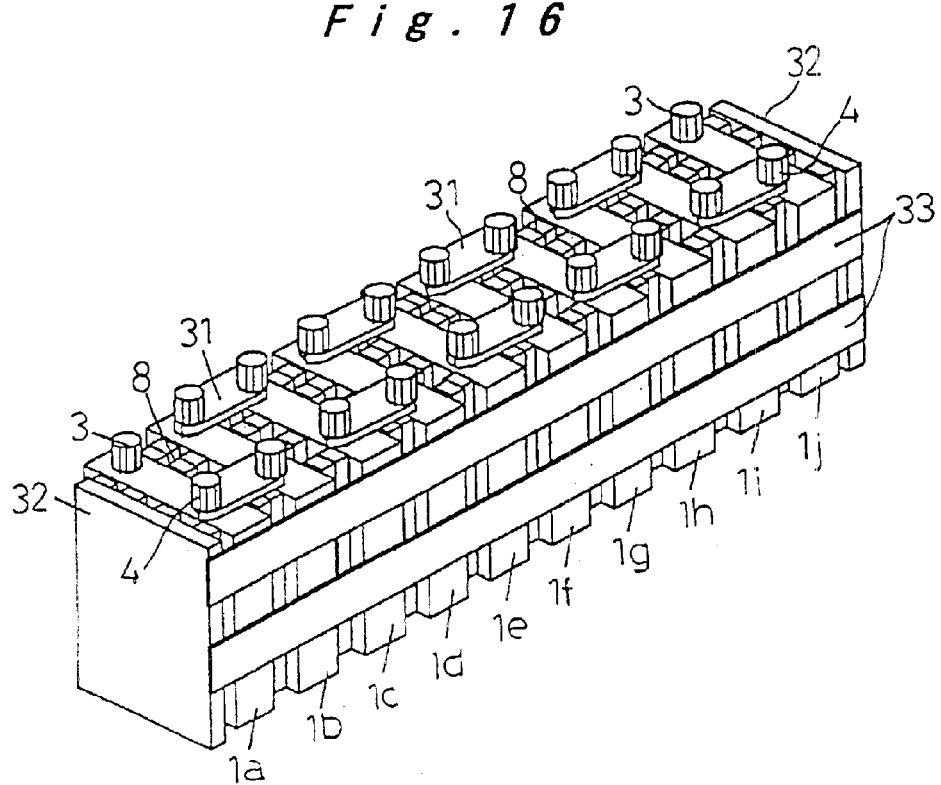
FIG. 16 is a perspective view of the structure of a rechargeable battery pertaining to prior art.

The results of comparative tests of rechargeable batteries A through F pertaining to the first through sixth embodiments described above and the conventional structure shown in FIG. 16 will now be described for the heat radiation effect thereof and the change in discharge capacity accompanying charge and discharge cycling. The cells that make up rechargeable batteries A, C, and D and the cells that make up rechargeable batteries B, E, and F share their internal structure, with the difference being that the latter make use of an integral battery case 22 or 36 rather than individual battery housings as with the former. The cells 1 employed in rechargeable batteries A, C, and D and in the conventional structure are the same.

Figure 15:
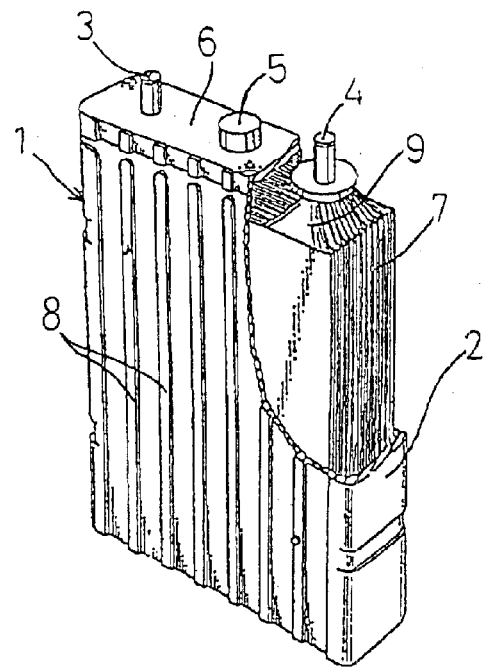
FIG. 15 is a perspective view of the structure of a cell.

First, the structure and capacity of the cells, which are common to all the structures, will be described. The cells 1 are structured as shown in FIG. 15. In the case of the cells 21, the battery housings 2 are changed to a battery case 22 or 36, as mentioned above.

In FIG. 15, the positive electrode plates that make up the group of electrode plates 7 are produced by packing nickel hydride powder (the active material) into a porous material (expanded nickel) and rolling this to a specific thickness, and then cutting this product to a specific size to form a nickel positive electrode with a capacity of 10 Ah per plate. The negative electrode plates are produced by coating punched metal with a binder and a hydrogen-absorption alloy powder having a composition that allows the electrochemical occlusion and release of hydrogen, rolling this to a specific thickness, and then cutting this product to a specific size to form a hydrogen-absorption alloy negative electrode with a capacity of 13 Ah per plate. These positive electrode plates and negative electrode plates are each wrapped in a pouch-like separator, and 10 of these separator-wrapped positive electrode plates and 11 negative electrode plates are alternately layered so that the total thickness is approximately 85 to 100% of the inside dimension of the battery housings 2 or the battery case 22 or 36. The leads from the various positive electrode plates are connected to the positive electrode terminal 3, the leads from the various negative electrode plates are connected to the negative electrode terminal 4, and this entire assembly is housed in the polypropylene battery housings 2 or battery case 22 or 36. The battery housings 2 or battery case 22 or 36 is filled with an alkali electrolyte, and the opening in the battery housings 2 or battery case 22 or 36 is sealed off by a cover 6 provided with a safety vent 5. The cells 1 or 21 thus produced are subjected to initial charging and discharging (15 hours of charging at 10 A, and discharging at 20 A down to 1.0 V), and the above-mentioned group of electrode plates 7 is expanded so that the outermost part thereof is in contact with the inner surface of the battery housings 2 or the battery case 22 or 36. The capacity of these cells 1 or 21 is limited by the positive electrode, so the battery capacity is 100 Ah. The nominal voltage per cell in a nickel metal-hybrid rechargeable battery is 1.2 V. Therefore, the output voltage is 12 V when 10 of the cells of these embodiments or of the conventional structure are connected in series.

A cycling life test was conducted for the rechargeable batteries A through F consisting of cells 1 with the capacity discussed above, and for a rechargeable battery with a conventional structure. This test involved charging for 12 hours at 10 A, allowing the battery to stand for 1 hour, and then discharging at 20 A until the voltage dropped to 9 V. The discharge capacity was calculated using the discharge time it took for the battery voltage to drop to 9 V. During charging, air was blown from a fan upward from the bottom of the rechargeable battery, with the ambient temperature set at 20° C., and the air was sent through the cooling passages at an average rate of 1.5 meters per second.

Figure 13A:
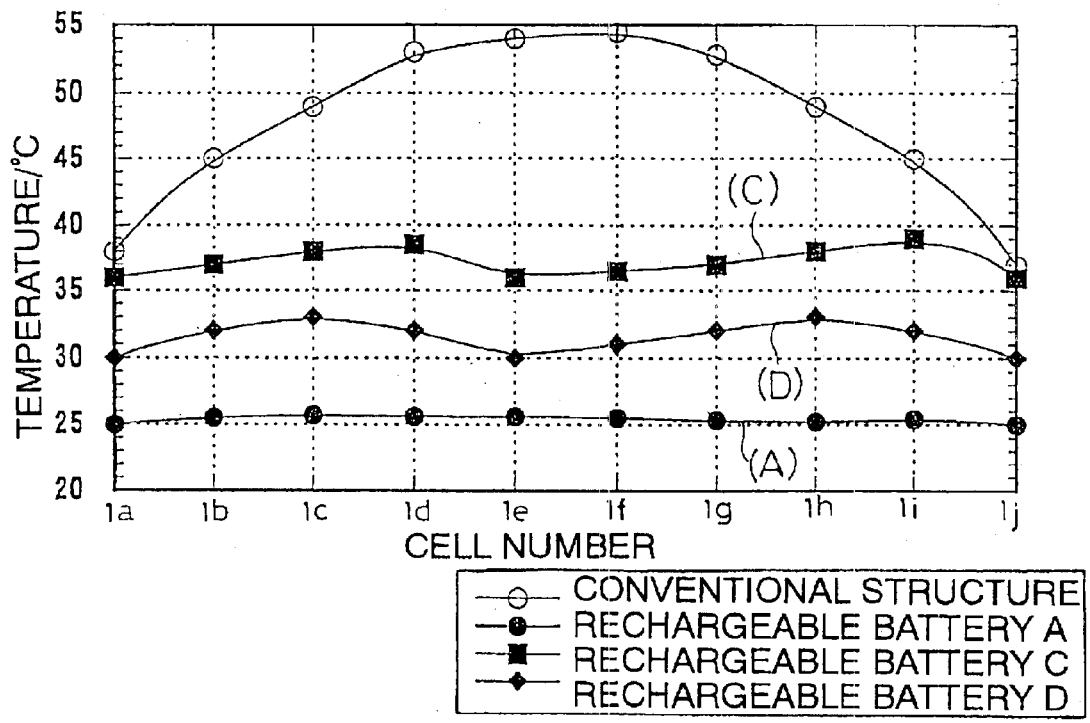
FIG. 13 is a temperature distribution graph illustrating the temperature differential in cells with the structures of various embodiments and a cell with a conventional structure.
Figure 13B:
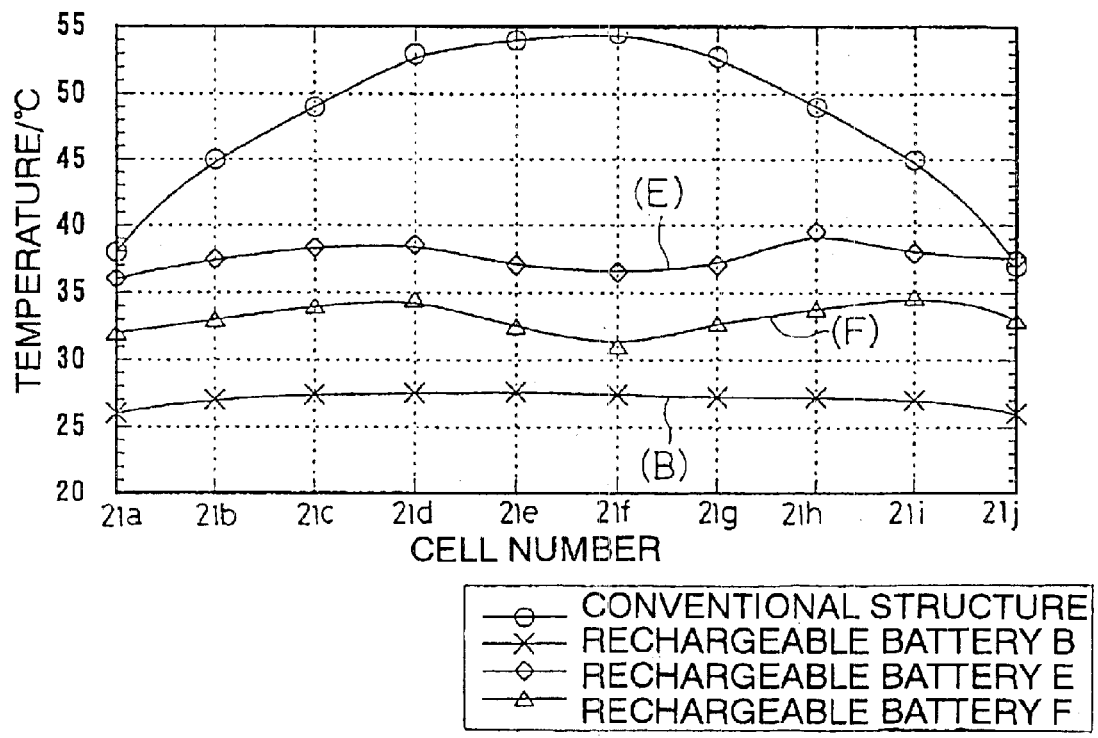

FIG. 13A shows the results of measuring the temperature distribution in the various cells 1a to 1j in the rechargeable batteries A, C, and D and in the conventional structure upon completion of charging after 100 cycles of this cycling life test. FIG. 13B shows the results of measuring the temperature distribution in the various cells 21a to 21j (1a to 1j in the conventional structure) in the rechargeable batteries B, E, and F featuring the cells 21 and in the conventional structure.

With the conventional structure, the temperature is relatively low at the cells 1a and 1j located at the ends, but the temperature is higher at the cells 1d to 1g closer to the middle, and it can be seen that there is a large temperature differential between the cells. In contrast, there is almost no temperature differential between the cells with rechargeable batteries A and B, and the temperature distribution is substantially uniform. With rechargeable battery C the overall temperature is relatively high, but the temperature distribution can be considered to be within a tolerable range. With rechargeable battery D, in which the heat transfer plate 30 is included in the structure of rechargeable battery C, the heat radiation effect of the heat transfer plate 30 clearly contributes to lowering the overall temperature. This same tendency is seen in a comparison of rechargeable batteries E and F. As is clear from this comparison test, the structure of these embodiments markedly reduces the temperature differential between cells as compared to the conventional structure, and also contributes to lowering the overall temperature.

Figure 14A:
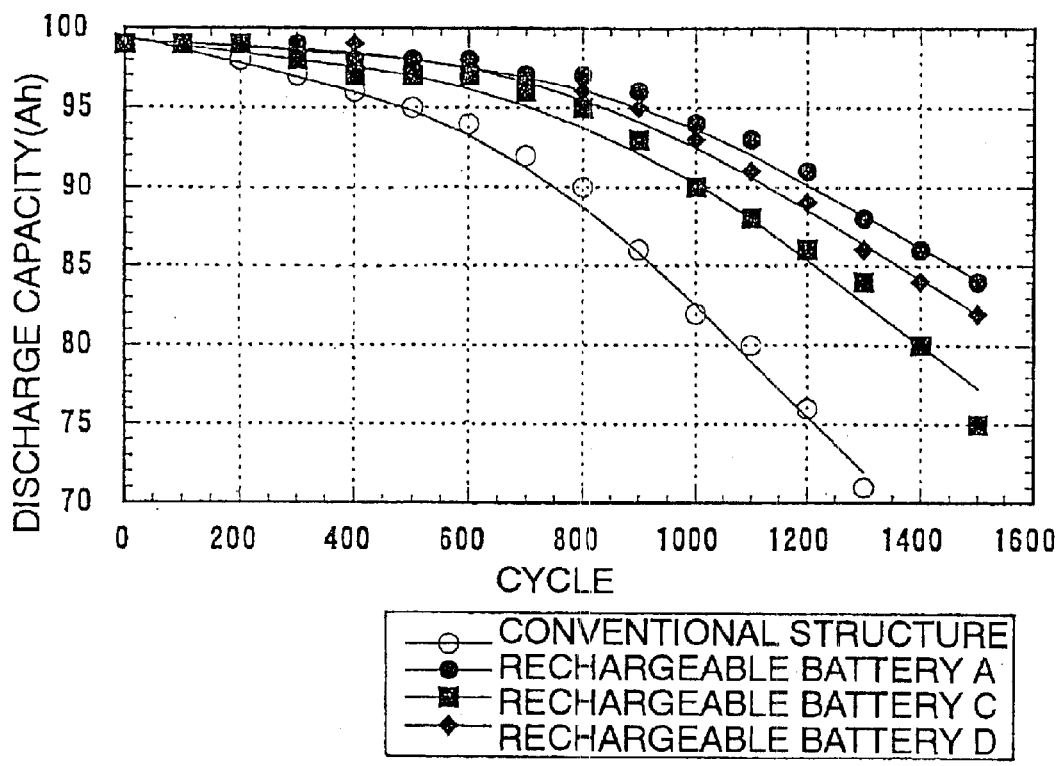
FIG. 14 is a cell life graph illustrating the difference in cycling life from changes in discharge capacity between the structure in various embodiments and a conventional structure.
Figure 14B:
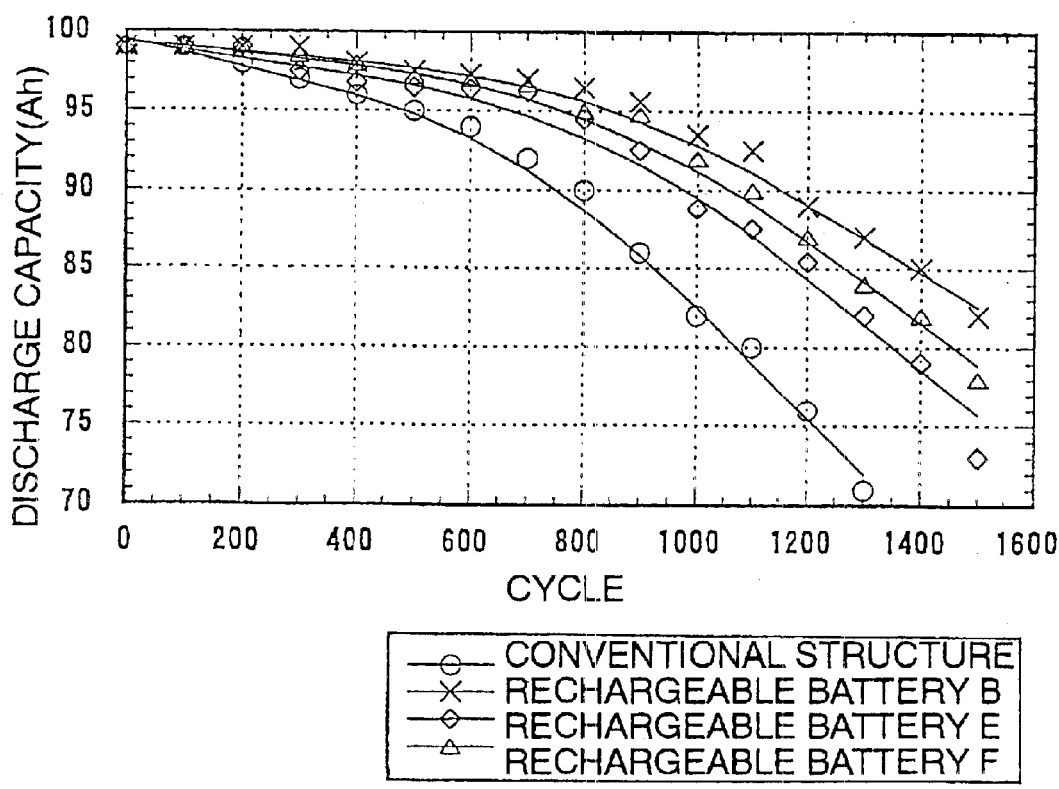

FIGS. 14A and 14B show the results of a cycling life test conducted under the same conditions as in the above test. FIG. 14A is a comparison of rechargeable batteries A, C, and D with the conventional structure, while FIG. 14B is a comparison of rechargeable batteries B, E, and F with the conventional structure.

With the conventional structure, the charge and discharge cycling in which the discharge capacity went from 100 Ah to 70 Ah was short, and it can be seen that the cycling life was shorter than with the various structures in the embodiments. Among the embodiments, the structures of rechargeable batteries A and B were superior in terms of cycling life, and the temperature differential between the cells was extremely small, so there was less difference in charging efficiency between cells and there was no variance in battery capacity, which is believed to be why there were no cells that were overdischarged. With the structures of rechargeable batteries C and E, the heat radiation effect of the heat transfer plate 30 diminished the temperature differential between the cells, and excellent battery performance was obtained even when the batteries were laid out in parallel rows.

Industrial Applicability

As described above, with the present invention, there is less temperature differential between the various cells when a rechargeable battery is structured as a battery pack in which the required output voltage is obtained by connecting a plurality of cells, so there is also less difference in charging efficiency, which varies with the temperature conditions. As a result, there is less difference in battery capacity, and none of the cells are overdischarged during discharging, so the batteries do not deteriorate as a result of overdischarge, which means that the cycling life of the rechargeable battery will remain long and battery performance is improved.

What is claimed is:

1. A rechargeable battery, comprising:
   a plurality of cells;
   each cell of said plurality of cells including elements for electromotive force and each cell being formed in a rectangular shape having short sides with a narrow width, long sides with a wide width relative to the narrow width, a top side, and bottom side;
   each cell of said plurality of cells including ribs extending on said long sides;
   said plurality of cells and being electrically interconnected and linked together adjacent to one another at the short sides to form a battery pack;
   a first binding plate adjacent the long sides of the plurality of cells on a first side of the battery pack, the first binding plate having an outer side edge parallel with the short sides of the plurality of cells;
   a second binding plate adjacent the long sides of the plurality of cells on a second side of the battery pack opposing the first side of the battery pack, the second binding plate having an outer side edge parallel with the short sides of the plurality of cells;
   at least one binding band at an end of the battery pack overlapping the outer side edge of the first binding plate and the outer side edge of the second binding plate;
   said first binding plate and said second binding plate forming coolant passages in conjunction with the first and second sides of the battery pack and the plurality of ribs; and
   coolant passing through the coolant passages.

2. A rechargeable battery, comprising:

a plurality of cells;

each cell of said plurality of cells including elements for electromotive force and each cell being formed in a rectangular shape having short sides with a narrow width, long sides with a wide width relative to the narrow width, a top side, and bottom side;

each cell of said plurality of cells including ribs extending on said long sides;

said plurality of cells including at least two groups of cells wherein the cells of each of the at least two groups are linked together adjacent to one another at the short sides to form at least two battery modules wherein the cells form at least one row in each of the at least two battery modules, the at least two battery modules being arranged in parallel with the long sides of the battery cells of the respective ones of the at least two battery modules adjacent one another, and the battery modules being linked together to form a battery pack and the plurality of cells being electrically connected;

a first binding plate adjacent the long sides of said cells on a first side of the battery pack, and the first binding plate having an outer side edge parallel with the short sides of said plurality of cells;

a second binding plate adjacent the long sides said cells on a second side of the battery pack opposing the first side, and the second binding plate having an outer side edge parallel with the short sides of said plurality of cells;

at least one binding band overlapping the outer side edge of the first binding plate and the outer side edge of the second binding plate; and said first binding plate and said second binding plate forming coolant passages in conjunction with the first and second sides of the battery pack and the plurality of ribs; and coolant passing through the coolant passages.

3. The rechargeable battery according to claim 2, further comprising a heat transfer plate with thermal conductivity provided between the battery modules disposed in parallel.

4. The rechargeable battery according to claim 2, further comprising a heat transfer plate with thermal conductivity provided between the battery modules disposed in parallel, and end heat transfer plates exposed to the outside linked to ends of the heat transfer plate in the direction in which the battery modules are linked.

5. The rechargeable battery according to claim 3 or 4, wherein the coolant is made to flow through the heat transfer plate and/or the end heat transfer plates.

6. The rechargeable battery according to claim 1 or 2, wherein the plurality of cells are linked together with the elements for electromotive force of each cell provided inside a battery case and the battery cases are integrally linked together.

7. The rechargeable battery according to claim 1 or 2, wherein the plurality of cells are integrally linked with the linking position and linking direction varied as desired.

* * * * *